Figure 1:
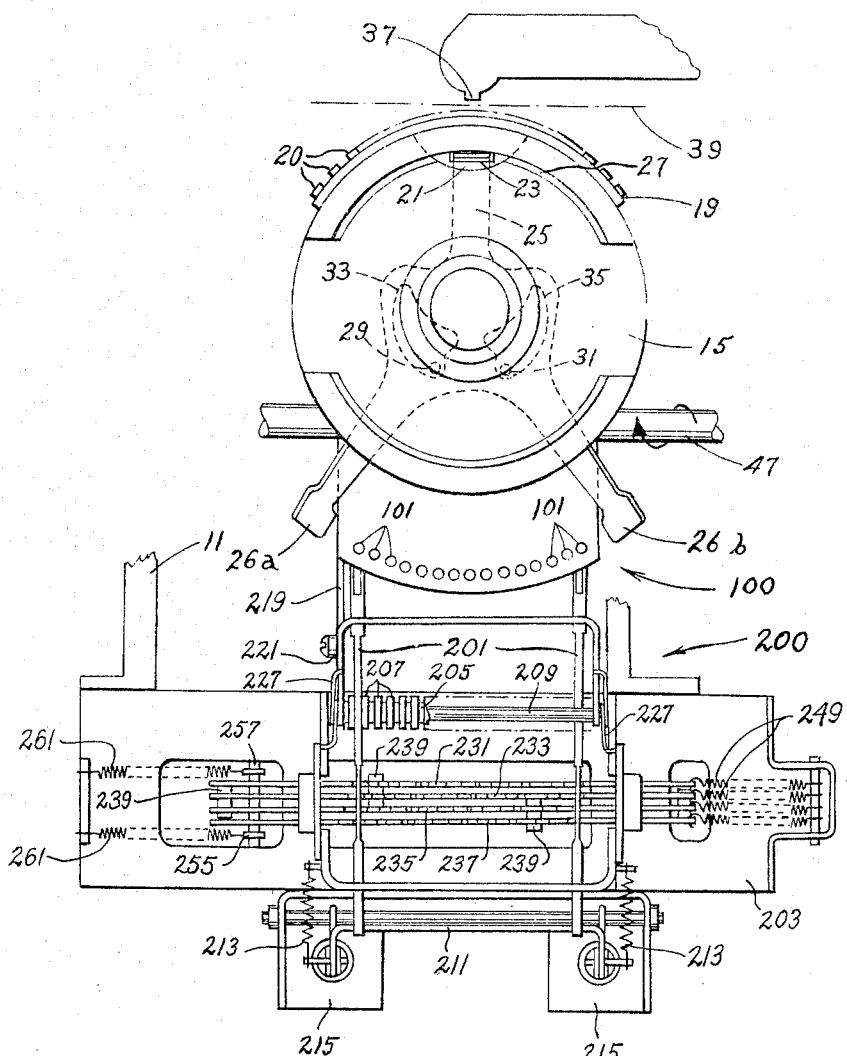

Oct. 4, 1966 R. W. WIRTZ 3,276,560
CODE BAR CONTROL FOR TYPE INDEXING
Filed Aug. 14, 1962 5 Sheets-Sheet 1

INVENTOR.
ROBERT W. WIRTZ
BY Russell L. Root
ATTORNEY

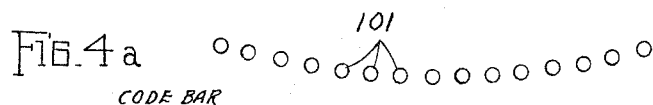
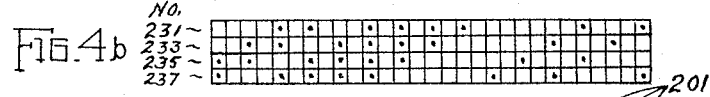
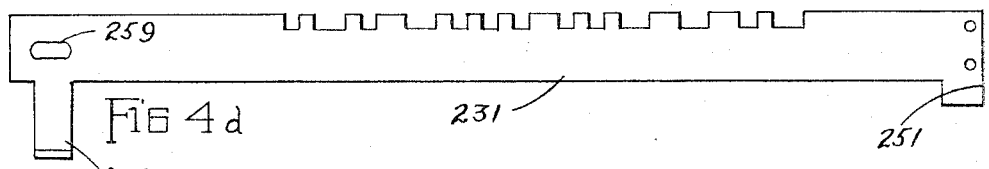
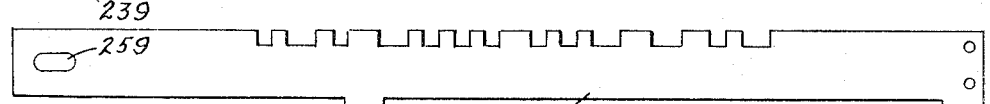
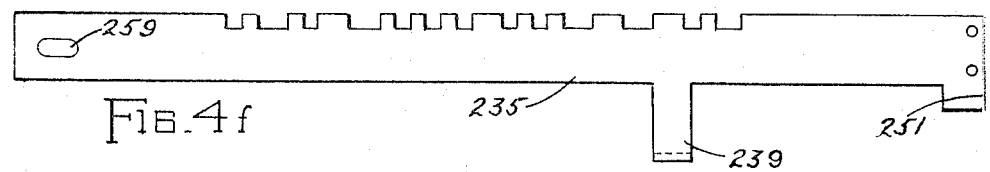
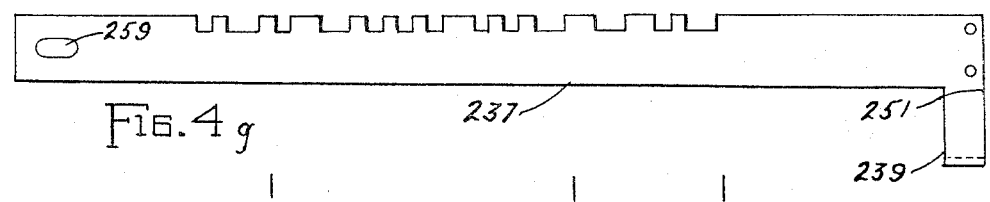

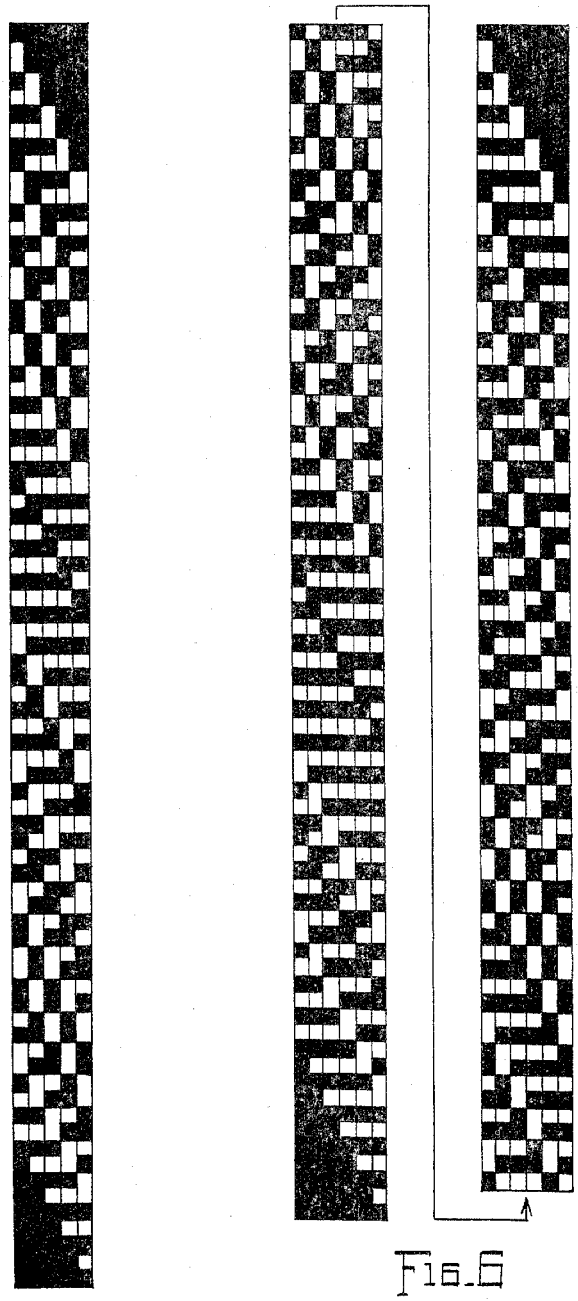

US Patent Office
3,276,560
Patented Oct. 4, 1966

3,276,560
CODE BAR CONTROL FOR TYPE INDEXING
Robert W. Wirtz, Watchung, N.J., assignor to Varityper Corporation, Newark, N.J., a corporation of Delaware
Filed Aug. 14, 1962, Ser. No. 216,825
4 Claims. (Cl. 197—18)

This invention relates to writing machines and more particularly to type indexing means therefor.

In the machine known as the Varityper composing machine or typewriter the printing instrumentalities include a type carrier or shuttle which is actuable, by any one of the key levers, about a center, through various angular distances to locate the desired type at the printing point. Said machine also includes a series of indexing devices or stops, with which a shuttle actuating lever cooperates, to assist in locating the types, as they are selected, at the printing point.

Heretofore the indexing devices or stops have been controlled by levers each associated with a character lever directly and individually controlled by a separate power supply which could be either manual actuation of a single special character key, or operation by a solenoid individually allocated to the operation of the lever in question.

In the interests of radical simplification, the present invention provides an arrangement wherein all stops and/or their immediate actuators can be controlled by various combinations of a very small number of code bars. In this way the mechanism is notably simplified, and is reduced significantly in complexity and cost. Since the solenoids or power devices required are directly associated with the code bars rather than with the stops, the degree of improvement achievable in this direction will be readily apparent.

In addition the present invention includes a discovery that it is possible to construct the necessary code bars in such a way that their profiles can be exactly matching, but designed to be shifted slightly out of register in use. Thus all code bars for a single machine can be milled at one time and an important manufacturing saving can be realized in situations where the volume of machine construction does not warrant preparation of tools to form the code bars.

In connection with the discovery set out in the immediately foregoing paragraph, it will be noted that the principals of identical code bars is one of substantial general application, and the invention in this respect, is not limited to the writing machine application herein disclosed, but may be used in connection with digital control operations of many kinds, as will be readily appreciated.

Heretofore the shuttle actuating lever has included a single arm normally situated in a central home position and movable in opposite directions into engagement with any one of fifteen stops on each side to determine thirty shuttle positions which is an adequate number to accommodate the number of characters used in normal writing operations. Such an arrangement is illustrated in the United States patent to Trego, No. 1,880,592.

The present invention has for another object the securing of a desired number of shuttle positions, but with relatively far fewer moving parts and manufacturing operations.

This is accomplished by providing the shuttle actuating lever with two arms instead of one, and these arms being positioned so as to encompass between them a much smaller number of stops, e.g. a total of fifteen, all in combination with the improved code bar control heretofore set out.

Other objects, features and advantages will appear hereinafter as the description proceeds.

Figure 2:
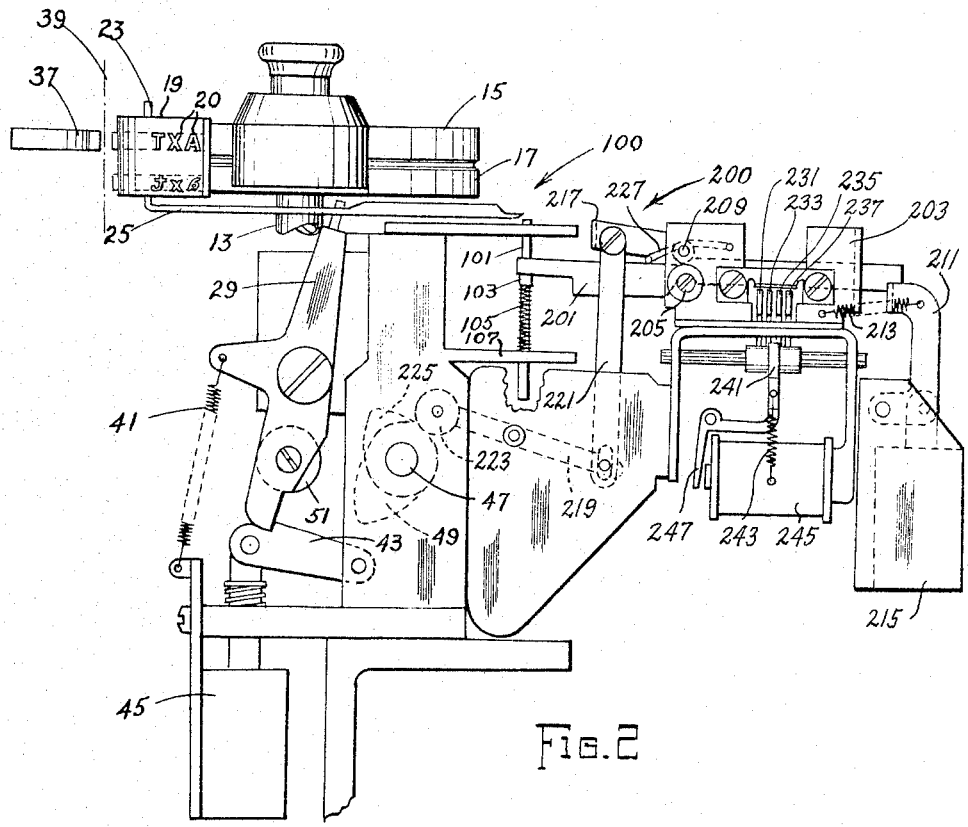
Figure 3:
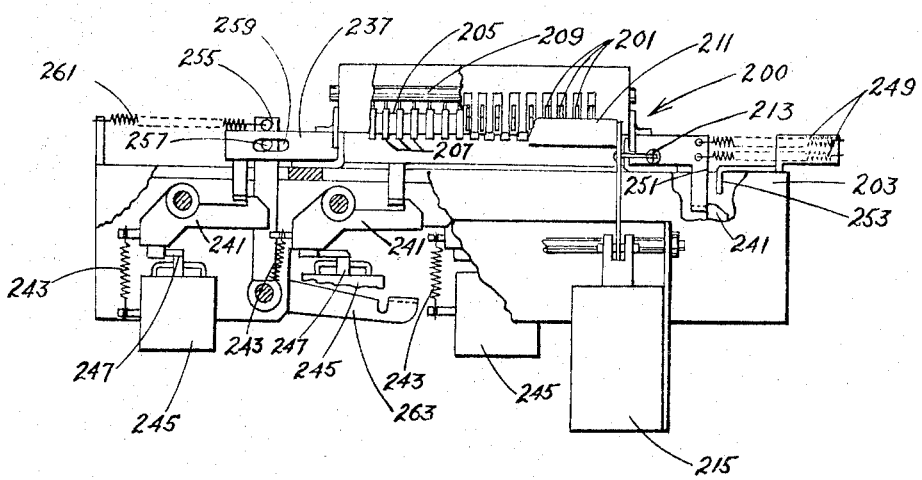

In the drawing:
FIG. 1 is a top plan of a writing machine according to the present invention;
FIG. 2 is a side elevation of the device shown in FIG. 1;
FIG. 3 is an end elevation of the control assembly with parts broken away to show the interior construction, taken from the right and looking towards the left in FIG. 2;
FIGS. 4a to 4h illustrate diagrammatically the construction of and relationship between the code bars and stop pins of FIGS. 1 to 3, FIGS. 4d to 4f being face views of each of the bars respectively;
FIG. 4i is a view similar to FIG. 4h but showing an alternate code bar arrangement for achieving the same result;
FIG. 5 is a chart similar to FIG. 4h, but illustrating the relationship of five code bars capable of controlling a maximum of 31 elements; and
FIG. 6 is a chart similar to FIG. 4h but illustrating the relationship of six code bars capable of controlling a maximum of 63 elements.

The machine illustrated in the drawing corresponds in a general way to a typewriter or composing machine operating on the familiar "Hammond" principle and currently known as a "Varityper" typewriter or composing machine. An illustration of a machine of this sort, operated by manually controlled character keys, is found in the patent to Trego cited above. In the form of the machine shown in the present drawing there is provided a frame 11, indicated in a fragmentary fashion, and suitably supported thereon an anvil rod or shaft 13 carrying at the upper end thereof a hollow cylindrical anvil 15 with a smooth outer surface and a circumferential slot 17. The anvil is relatively fixed, except for being vertically shiftable in a known manner (e.g. to "shift" or change between lower and upper case).

Slidable on the outer surface of the anvil is a type sector or shuttle 19 carrying type 20 and provided with a fin 21 passing through slot 17 and apertured to receive the upturned finger 23 at one end of a shuttle actuating lever 25 which is so mounted as to be rockable about the axis of the rod 13, the floor of anvil 15 including a sector-shaped slot 27 through which the finger 23 passes.

Means are provided for swinging the shuttle actuating lever 25 in either clockwise or counterclockwise direction from its central or home position, comprising drive levers 29 and 31 pivotally supported at a suitable point on the frame and with their upper extremities engaged in suitable cam profile openings 33, 35 in the lever 25.

In order to position the shuttle to select the type desired, a stop assembly 100 is provided, comprising a plurality of stop pins designed, when in raised position, to interrupt the movement of lever 25, each at a different location. Pin control means 200 is also provided for raising that stop pin which corresponds to a selected character position whereby the lever 25 will stop at the desired location placing the selected type character at the printing point in a known manner. After the selected type reaches the printed point a hammer 37 is automatically operated to cooperate with the said type to print the selected character on a work sheet 39.

Many of the machines of the type in question are operated by direct mechanical linkages as shown in the cited patent. However, they may also be otherwise operated as illustrated herein, especially in FIG. 2. Drive levers 29 and 31 may for example, be powered by tension springs such as shown at 41 and a latch, such as latch 43, used to retain the levers in unoperated position. A solenoid 45, when energized, retracts latch 43, and thereby releases lever 29 or 31 so that the same can be operated by its spring 41 and thereby actuate the shuttle lever 25 in the appointed direction. It will be understood that suitable electric switching means for solenoid 45 may be actuated either by the appropriate set of manual character or key levers, or by any other signal, for example an appropriate signal sent thereto in response to sensed data on a document such as a punched card. There may also be provided shaft 47 actuated by a single revolution clutch (not shown) triggered by the key lever or sensing head. This shaft 47 carries cams for operating switches for controlling driving or release solenoids in proper sequence during each cycle of operation, to insure that actuation of hammer 37 and of a suitable paper carriage escapement (not shown) occur in the desired sequence, and providing utlimately for the restoration of lever 29 or 31 by a mechanical cam actuation, for example due to the coaction of cams such as cam 49 and follower rollers such as roller 51 on the drive levers 29 and 31. The actuation of stop pins 101 and the subsequent energization of either of solenoids 45 may be sequenced by use of a conventional timing relay as will be readily understood. Release of the one-revolution clutch which controls shaft 47 may be simultaneous with the energization of either solenoid 45 and may be mechanically effected thereby if desired.

The structure described to this point corresponds to that shown in the cited patent, or an analogy thereof, and forms a part of the present invention only in combination with features hereinafter described.

In order to perform the type selection function according to the present invention, the shuttle actuating lever is altered from prior configurations, and is made to include two stop or abutment arms 26a and 26b which diverge to encompass a sector of about 60°, and so arranged that all of the stop pins making up the stop assembly 100 are normally arrayed between them.

The stop assembly 100 includes a plurality of stop pins 101, only one of which is shown in FIG. 2 to avoid conflict. Each pin 101 has an integral shoulder 103, and is urged upwardly into stopping position by a compression spring 105 acting between the shoulder 103 and a frame abutment 107. Each pin is retained in retracted position against the force of its spring 105 by the action of a forked lever 201 included in the pin control assembly 200. It will be understood that there is one forked lever 201 for each pin 101, although only the two forked levers at opposite ends of the array are shown in FIG. 1 to avoid congestion. Operation of a selected lever 201 to allow one of the stop pins 101 to rise into stopping position can be brought about in various ways either by direct mechanical connection with a manual key, or in other ways employing electrical control either from a key or sensed data in a manner presently to be described.

The feature of the arrangement thus far described is that the number of stop pins 101 employed is equal to only one-half of the number of positions in which it is desired to place the shuttle 19. In the example shown, the conventional number of positions, namely 30, is assumed to be required. To obtain this, fifteen pins 101 are employed. This is feasible because it is now possible to use both sides of each pin for stopping. In other words when any one of the pins 101 is raised, it can act as the selecting agent for two different type characters. If the signal given calls for the operation of drive lever 29 whereby shuttle actuating lever 25 rotates clockwise, one type character will be selected and brought to the printing point by the arm 26b striking the right side of the raised pin 101. On the other hand, if the signal given calls for the operation of the drive lever 31 whereby the shuttle actuating lever 25 rotates anticlockwise, another and different character will be selected and brought to the printing point by the arm 26a striking the left side of the raised pin 101. The signal calling for the raising of any particular pin 101 is, therefore, tied in to the selection of either of two different type characters 20 on shuttle 19, one on each half thereof, instead of with only one character as heretofore.

From the immediately preceding description it can be seen that, through the offices of a very simple mechanical change, there has been provided an improved writing mechanism employing a novel principle of shuttle positioning such that the number of parts required is materially reduced. Since the parts in question, namely the stop pins 101 and the elements which guide them, are those requiring accurate dimensioning and positioning for good writing results, substantial savings in fabrication and assembly of writing machines working on the type shuttle principle can be effected.

Turning now to the pin control assembly 200, as previously pointed out this includes forked pin control levers 201, one engaged with each of the stop pins 101. These levers are arranged in generally parallel position, passing through the pin control assembly frame 203. They are slightly recessed on their bottom edges and rest rockably upon the upper surface of a shaft 205 which is provided with spacers 207 for accurately locating the levers 201 each in a predetermined position. A retaining shaft 209 overlies the levers and holds them rockably against the upper surface of shaft 205.

The normal position of levers 201 is that illustrated in FIG. 2, wherein all of the stop pins 101 are held down against the force of their springs 105. To achieve this there is provided a pivoted latch bail 211 positioned to underlie the ends of levers 201 remote from the pins 101. The bail 211 is held in this position by springs 213, and by maintaining the right-hand ends of levers 201 in raised position, keep the left-hand ends thereof rocked to lowered position, thus maintaining the pins 101 retracted. The latch bail 211 is also connected to the plunger or plungers of one or more solenoids 215, and are so arranged that solenoid energization retracts the bail 211 from beneath the tips of levers 201. In order to restore the levers 201 to FIG. 2 position after energization of solenoids 215 is terminated, there is provided a cocking bail 217 which is actuated at an appropriate point in the cycle of operation by a lever 219 which acts through link 221 and which by means of a follower 223 coacts with and is driven by a cam 225 on shaft 47. The cocking bail 217 is urged to an upward position by torsion spring 227, but, as can be seen in FIG. 2, will be lowered against the force of this spring whenever the high point of cam 225 acts on follower 223 to thereby lower the left-hand ends of levers 201, thus raising the right-hand ends thereof and allowing latch bail 211 to be returned to FIG. 2 position by its spring 213.

Swinging of the pin control levers is under control of set of binary code bars 231, 233, 235 and 237, whose specific configurations are shown in detail in FIGS. 4d, 4e, 4f, and 4g respectively. These bars arranged parallel to each other and are positioned in the pin control assembly frame 203 generally transversely of and underlying the pin control levers 201. They are arranged for a short sliding movement between a latched position and an operated position. In FIGS. 1 and 3 the code bars 231–237 are all shown in latched or battery position. Each has a depending bent ear or tab 239 positioned to lie in the path of a latch. There is one pivoted latch for each bar, three being shown in FIG. 3 and each designated 241. A tension spring 243 for each latch normally holds the same in raised position so that the corresponding code bar is held in battery position. An electromagnet 245 is provided for each latch 241 and acts thereon through the medium of a pivoted lever 247 arranged to move the latch to release position when the magnet 245 is energized. Whenever a latch 241 is thus released, tension springs 249 connected to the corresponding code bar and anchored on the control assembly frame 203, shift the code bar to operative position so that an abutment surface 251 with which it is provided comes into contact with a suitable stop 253 (FIG. 3).

Retraction of the code bars from operated position to battery position is effected by a retracting bail 255, a portion 257 of which passes through aligned elongate openings 259 in the four code bars. One or more springs 261 are provided which act to pull the bail 255 to the left in FIGS. 1 and 3, and which are stronger than the sum of the springs 249. (The retracting bail and its operating elements have been omitted in FIG. 2 to avoid congestion.) The springs 249, when allowed to do so, act to return any operated code bar to the left of its latched position, each snapping by its latch 241. Noramlly the bail is retained in an ineffective position as seen in FIGS. 1 and 3 in opposition to the force of springs 261, by a lever which may be actuated in any suitable manner, but preferably by a direct or indirect mechanical coaction with a cam (not shown) on the timing shaft 47 as will be readily understood.

The code bars are so profiled or notched that when any combination of one or more bars is in operated position, a clear notch path of four aligned notches will be offered to one of the levers 201 so that the same may drop into the notch path after bail 211 is retracted, thereby causing its left end to pivot upward and allowing the corresponding stop pin 101 to rise interrupting the motion of lever 25 and thus selecting a corresponding type character on the shuttle 19. Each such code bar combination provides a unique notch path and permits dropping of one and one only of the levers 201.

The notched bars 231, 233, 235 and 237 described herein are binary in character and their notched edges act jointly to select individual ones of the levers 201 when the bars are actuated in various combinations. Bars of this character are often referred to as "permutation bars" in arts which make use of them. This, however, is perhaps somewhat of a misnomer, and the term "combination code bars" seems more nearly apt in describing bars which are actuated in various combinations to select individual ones of a group of other elements with which they all directly coact. It will be understood, therefore, that when the expression "combination code bars" is used herein the significance just outlined is intended.

In operation of the device, signals are sent from a manual key lever, or from a sensing head, as the case may be, establishing circuits which energize certain of the solenoids 245 to release the corresponding code bars. After an appropriate time interval, preferably relay established, the solenoid 215 is automatically energized to retract bail 211. The key lever or sensing head also sets up a circuit to either the solenoid 45 associated with drive lever 29 or that associated with drive lever 31 and this circuit is completed at a suitable short time interval (again established by a conventional delay relay) after operation of solenoid 215. These two sets of signals governing the code bars and selecting drive lever 29 or 31 are sufficient to determine a single desired type character 20 on the shuttle 19. At the same time that solenoid 45 is energized the timing shaft 47 is released to generate a single cycle of operation. This puts into effect a chain of events which preferably occur in sequence as follows, preferably either by means of mechanical cams on shaft 47, or by switches operated by cams on shaft 47 to complete appropriate circuits:

(1) When the solenoid controlling whichever of the levers 29, 31 was selected by the key or sensing head, the lever 25 is thereupon rocked in the indicated direction until its corresponding abutment 26a or 26b strikes the raised stop pin 101, and the desired character on shuttle 19 finds itself at the printing point.

(2) Hammer 37 is suitably actuated to print the selected character.

(3) The drive lever 29 or 31 is restored by cam 49, returning the shuttle 19 to home position.

(4) The raised lever 201 and its corresponding stop pin 101 are restored by bail 217 in response to the action of cam 225, latch 211 then snapping into place, and bail 217 promptly moving to inoperative position.

(5) Lever 263 is released, the operated code bars are restored to battery position by retracting bail 255 under the influence of springs 261, and each such code bar snaps by its latch 241 to latched condition. Bail 255 is then promptly moved to inoperative position by its lever 263.

(6) The cycle is then complete and the timing shaft 47 stops and awaits the signals pertinent to the next character.

The details of the binary code bars 231–237 are perhaps best seen in FIGS. 4a to 4h where their profiles are clearly illustrated. FIG. 4a represents the fifteen stop pins 101. FIG. 4c represents diagrammatically the fifteen pin control levers 201 cooperating with the stop pins. FIGS. 4d to 4g show the four code bars in unoperated position. FIG. 4b is a chart indicating which code bars must be operated (i.e. moved to the right) to permit actuation of the corresponding pin 101.

An interesting feature of the code bars illustrated in FIG. 4 is that their profiles are all identical. It will be noted that the notched profile of each bar is slightly longer than need be to cover the level span, and that each profile is offset one complete lever space from the profile on one of the other bars. By selecting and arranging the notches in the proper order it is thus possible to provide four code bars, identically profiled which will perform a unique selection of a single one of fifteen levers for each combination of code bars. This makes it possible to machine all of the code bars at the same time by merely offsetting them the proper amount, clamping them in offset position, and milling the single common profile in all bars simultaneously.

According to the invention it has been determined what profile pattern will give this result, and FIG. 4h is a chart illustrating the four identical profiled bars and their relationship when the profiles are offset to working relationship. In the chart of FIG. 4h the white squares represent gaps or notches while the dark squares represent obstructions. In a sense, FIG. 4h may be understood as an edge view of the four bars placed side by side. Fig. 4h may be said to illustrate the principle by which said common profile is selected, for it will be understood that the pattern shown is a non-ending circular arrangement and that equivalently effective designs can be achieved by merely joining the ends of the effective portion of a code bar profile and making a break at another location with all of the bars then being adjusted, of course, to the new profile so as to be identical. One such variation of the set indicated in FIG. 4h is shown in FIG. 4i wherein the code bar profiles have all been shifted five steps around the circle. Of course, many other variations may be arrived at by shifting any other number of whole steps in like manner. For convenience, all of these various alternate forms of a code bar set thus arrived at will be referred to as the "circular variations" thereof. Any of the bar combinations shown, or the circular variations thereof, can also, of course, be reversed end-for-end and operated successfully in that position. For convenience these manifestly equivalent variants may be referred to as "reversals and circular variations" of the profiles shown in the drawings, and when this language is used hereinafter the foregoing significance will be understood as attaching thereto. Moreover, when the profiled bars are made, it should be noted that they can be placed and operated in any order, and the regularly staggered position shown need not be adhered to in use.

Inasmuch as the immediately foregoing principle is applicable to other situations wherein other numbers of bars and levers will be required, certain variations have been introduced by way of illustration. FIG. 5, for example is a chart similar to FIG. 4h, but showing how five identically profiled bars can be designed to control up to 31 movable levers or elements, and FIG. 6 similarly illustrates how six identically profiled bars can be designed to control up to 63 movable levers or elements. Alternatives such as those explained for FIG. 4h apply with equal force to these arangements as well.

While the forms of the invention shown and described herein are admirably adapted to fulfill the objects primarily stated, it is to be understood that it is not intended to confine the invention to the forms disclosed herein, for the invention is susceptible of embodiment in other forms and variations. It will be understood, therefore, that the invention is claimed in any of its forms or modifications falling within the spirit and scope of the language employed in the appended claims.

What is claimed is:

1. In a selecting mechanism a set of four notched combination code bars capable of coacting with each other to select any one of a plurality of movable elements up to fifteen by actuation of various combinations of said code bars, in which the profile of each of said bars is arranged with its notches and obstructions in an order corresponding to that shown in chart of FIG. 4h, including reversals and circular variations thereof, the profiles of all of said bars being identical.

2. In a selecting mechanism a set of five notched combination code bars capable of coacting with each other to select any one of a plurality of movable elements up to thirty-one by actuation of various combinations of said code bars, in which the profiles of each of said bars is arranged with its notches and obstructions in an order corresponding to that shown in the chart of FIG. 5, including reversals and circular variations thereof, the profiles of all of said bars being identical.

3. In a selecting mechanism a set of six notched combination code bars capable of coacting with each other to select any one of a plurality of movable elements up to sixty-three by actuation of various combinations of said code bars, in which the profile of each of said bars is arranged with its notches and obstructions in an order corresponding to that shown in the chart of FIG. 6, including reversals and circular variations thereof, the profiles of all of said bars being identical.

4. In a writing machine, the combination of a rotary type carrier; means for driving said carrier in either direction about its axis including a rockable lever provided with spaced abutments and having a normal central home position; means for stopping said lever in a plurality of different type selecting positions including a plurality of shiftable stops arranged in a row between said abutments when the lever is in home position; a plurality of elongate movable elements associated with said stops; means for controlling said movable elements including only four shiftable combination code bars having notched profiles extending transversely of and cooperable with said movable elements, said code bars each having its notches and obstructions arranged in an order corresponding to that shown in the chart of FIGURE 4h including reversals and circular variations thereof, the profiles of all of said code bars being identical; and means to communicate to said carrier driving means and to said code bars a combination of signals defining the type character on said carrier which it is desired to select.

References Cited by the Examiner

UNITED STATES PATENTS

| | | | |
|---|---|---|---|
| Re 22,394 | 11/1943 | Moore et al. | 101—93 X |
| 466,490 | 1/1892 | Eckels | 197—49 X |
| 1,328,822 | 1/1920 | Dalton et al. | 101—93 X |
| 1,880,592 | 10/1932 | Trego | 197—51 |
| 1,946,915 | 2/1934 | Peirce | 101—93 |
| 2,090,944 | 8/1937 | Hebel | 178—23 |
| 2,106,805 | 2/1938 | Lang | 178—23 |
| 2,309,069 | 1/1943 | Sobisch | 101—46 X |
| 2,895,337 | 7/1959 | Moring et al. | 178—27 X |
| 2,898,830 | 8/1959 | Wirtz et al. | 197—48 X |
| 2,938,952 | 5/1960 | Roggenstein | 197—19 X |

ROBERT E. PULFREY, *Primary Examiner.*

EDGAR S. BURR, *Assistant Examiner.*